United States Patent
Menhusen et al.

(10) Patent No.: US 11,768,772 B2
(45) Date of Patent: Sep. 26, 2023

(54) ACCUMULATORS CORRESPONDING TO BINS IN MEMORY

(71) Applicant: HEWLETT PACKARD ENTERPRISE DEVELOPMENT LP, Houston, TX (US)

(72) Inventors: Ryan D. Menhusen, Ft. Collins, CO (US); Darel Neal Emmot, Wellington, CO (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/644,352

(22) Filed: Dec. 15, 2021

(65) Prior Publication Data

US 2023/0185721 A1 Jun. 15, 2023

(51) Int. Cl.
*G06F 12/0846* (2016.01)
(52) U.S. Cl.
CPC .... *G06F 12/0848* (2013.01); *G06F 2212/608* (2013.01)
(58) Field of Classification Search
None
See application file for complete search history.

(56) References Cited

U.S. PATENT DOCUMENTS

| | | |
|---|---|---|
| 4,075,423 A | 2/1978 | Martin et al. |
| 5,944,774 A | 8/1999 | Dent |
| 6,718,392 B1 | 4/2004 | Krause |
| 6,829,685 B2 | 12/2004 | Neal et al. |
| 6,950,945 B2 | 9/2005 | Pfister et al. |
| 6,990,528 B1 | 1/2006 | Neal et al. |
| 7,010,633 B2 | 3/2006 | Arndt et al. |
| 7,103,626 B1 | 9/2006 | Recio et al. |
| 7,113,995 B1 | 9/2006 | Beukema et al. |
| 7,493,409 B2 | 2/2009 | Craddock et al. |
| 7,979,548 B2 | 7/2011 | Arndt et al. |
| 8,392,668 B2 | 3/2013 | Reuter |
| 8,407,421 B2 * | 3/2013 | Steely, Jr. ........... G06F 12/0806 711/134 |
| 9,112,767 B2 | 8/2015 | Ansari et al. |
| 9,575,890 B2 | 2/2017 | Busaba |
| 10,185,824 B2 | 1/2019 | Venkataramani et al. |

(Continued)

OTHER PUBLICATIONS

Ryan D. Menhusen, U.S. Appl. No. 17/644,353 entitled Memory Partitions for Processing Entitles filed Dec. 15, 2021 (31 pages).

*Primary Examiner* — Yaima Rigol
(74) *Attorney, Agent, or Firm* — Trop, Pruner & Hu, P.C.

(57) ABSTRACT

In some examples, a system includes a processing entity and a memory to store data arranged in a plurality of bins associated with respective key values of a key. The system includes a cache to store cached data elements for respective accumulators that are updatable to represent occurrences of the respective key values of the key, where each accumulator corresponds to a different bin of the plurality of bins, and each cached data element has a range that is less than a range of a corresponding bin of the plurality of bins. Responsive to a value of a given cached data element as updated by a given accumulator satisfying a criterion, the processing entity is to cause an aggregation of the value of the given cached data element with a bin value in a respective bin.

20 Claims, 6 Drawing Sheets

(56) References Cited

U.S. PATENT DOCUMENTS

| | | | |
|---|---|---|---|
| 10,824,694 B1 | 11/2020 | Gebremariam et al. | |
| 10,929,293 B2 | 2/2021 | Byrne et al. | |
| 2014/0310462 A1* | 10/2014 | Waldspurger | G06F 11/3476 |
| | | | 711/118 |
| 2016/0140052 A1* | 5/2016 | Waldspurger | G06F 12/121 |
| | | | 711/136 |
| 2018/0239792 A1* | 8/2018 | Ting | G06N 7/01 |
| 2021/0056397 A1 | 2/2021 | Dally et al. | |
| 2021/0056399 A1 | 2/2021 | Dally et al. | |
| 2021/0056446 A1 | 2/2021 | Dally et al. | |
| 2022/0237124 A1* | 7/2022 | Gottin | G06F 12/0882 |

* cited by examiner

ACCUMULATORS CORRESPONDING TO BINS IN MEMORY

BACKGROUND

Data analytics may be applied on input data received at a system, which can include multiple processing entities. Examples of data analytics that can be applied include a counting sort algorithm in which a collection of data objects can be sorted according to keys. The counting sort algorithm operates by counting the number of data objects that possess distinct key values. In other examples, other types of data analytics that involve some type of aggregation of values can be performed.

BRIEF DESCRIPTION OF THE DRAWINGS

Some implementations of the present disclosure are described with respect to the following figures.

Figure 1:
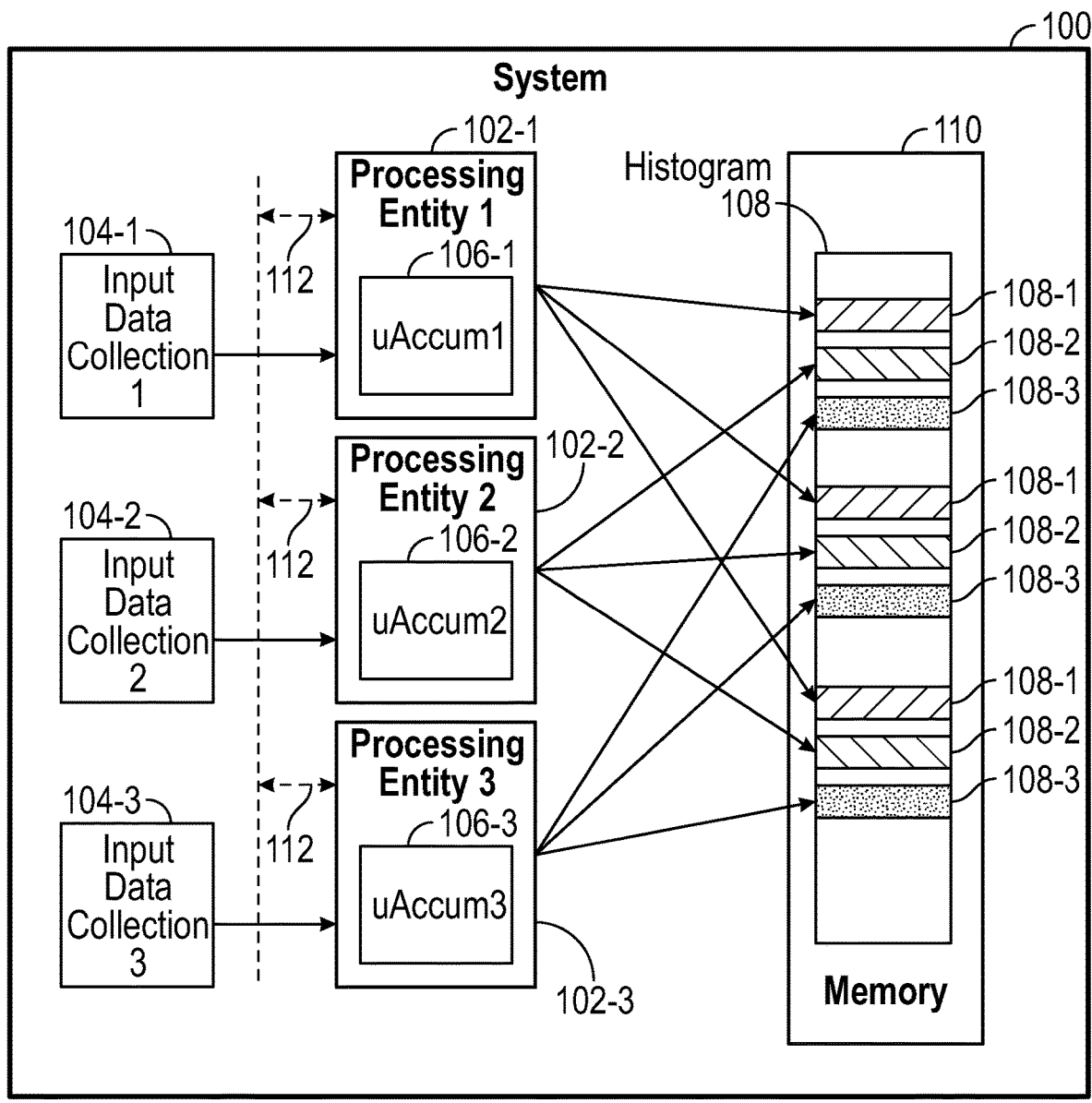
FIG. 1 is a block diagram of a system including micro-accumulators according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A system that includes a large quantity of processing entities can process a large amount of input data. In some cases, there may be petabytes of data to be processed.

Processing entities can refer to machine-readable instructions or hardware processors. For example, processing entities can include threads. A multi-threaded system can execute multiple threads in parallel. Hardware processors can include microprocessors, cores of multi-core processors, microcontrollers, digital signal processors, or any other type of processing circuitry.

Distributed data analytics can be performed by processing entities in multiple compute nodes. A "compute node" can refer to a computer or a collection of multiple computers. In some cases, to be able to efficiently apply certain types of data analytics (e.g., counting sort, etc.) to input data, all of the input data may have to fit within a local memory of each compute node in the system to allow the distributed data analytics to finish in a reasonable amount of time. If there is a large amount of input data (e.g., petabytes of input data), then the local memory in each compute node would have to be quite large to be able to store such input data. However, it is impractical and quite costly to employ systems with compute nodes that include large local memories, particularly if there are hundreds or thousands of compute nodes in the system.

In other cases, if the local memories of compute nodes are not sufficiently large to store all of the input data, a multi-pass data analytics technique may be employed, in which the input data is processed in smaller segments over multiple passes. In any of these passes, target output data can be produced by the data analytics (e.g., count sorted data, etc.). Performing data analytics in multiple passes can add to the overall processing time.

In some examples, a compute node can include multiple levels of memory. The multiple levels of memory can include main memory as well as various cache memories (or more simply, "caches"). The main memory of a compute node is a memory with a relatively large data storage capacity. The caches of the compute node have smaller data storage capacities, but have higher access speeds than the main memory. As used here, a "main memory" can refer to any memory with a larger capacity than a cache.

In a compute node with three levels of cache, the level 1 (L1) cache is the cache that is the closest to the processor, and in some cases, the L1 cache can be included in the processor. The next level cache, the level 2 (L2) cache, can be larger than the L1 cache. The next level cache, the level 3 (L3) cache can be in turn larger in size than the L2 cache. The L2 cache can also be part of the processor, as can the L3 cache. In other examples, the L3 cache can be external of the processor. In other examples, a compute node can include fewer or more levels of caches.

Although reference is made to examples where the main memory is part of a compute node, in other examples, the main memory can be outside of the compute node, and in fact, can be shared by processing entities in multiple compute nodes.

In some examples, a main memory can be implemented with a collection of memory devices (one memory device or multiple memory devices), such as dynamic random access memory (DRAM) devices, flash memory devices, and so forth. Caches can be implemented with static random access memory (SRAM) device(s), DRAM device(s), and so forth.

In the ensuing discussion, in examples where the main memory is shared by multiple processing entities (in a single compute node or in multiple compute nodes), the main memory can be referred to as a "shared memory."

Poor utilization of caches during data analytics, such as during a distributed counting sort operation, may result in increased processing time. In some cases, the output of the data analytics (e.g., counting sort) can be in the form of a histogram that has multiple bins. Each bin of the histogram corresponds to a respective unique value of a key that is present in input data. A "key" can include a collection of attributes (a single attribute or multiple attributes) that has assigned values. Input data records can each include multiple attributes, and a key can include one or multiple of such attributes. When counting sort is applied on input data, for example, each bin of the histogram stores a count value that represents a quantity of occurrences of each unique value of a key.

Although reference is made to a histogram, in other examples, other types of data structures can be stored in a shared memory to receive values produced by data analytics performed by processing entities.

In accordance with some implementations of the present disclosure, more effective utilization of caches is provided when applying data analytics to produce outputs that update bins of an output data structure (e.g., a histogram) in a shared memory. In some examples, an accumulation data structure includes accumulators that update cached data elements in a cache. The accumulation data structure is used to efficiently update data in bins in a memory. The accumulators can locally update the cached data elements, and when a given cached data element has been updated such that its value satisfies a criterion (e.g., the value of the given cached data element has reached a maximum value), the corresponding accumulator causes the value of the given cached data element to be aggregated with a value in a respective bin in the memory.

In some examples, the accumulators of the accumulation data structure are counters that count occurrences of unique values of a key (such as for a counting sort operation), and a cached data element stored in the cache is a count value that is incremented in response to each occurrence of a respective unique value of the key. In other examples, accumulators of an accumulation data structure can perform other types of aggregation, such as decrementing, summing, etc., in response to values of a key.

1. Micro-Accumulators for Accumulating Values of a Histogram

FIG. 1 shows an example system 100 that includes multiple processing entities 102-1, 102-2, and 102-3. Although three processing entities are shown in FIG. 1, in other examples, there can be less than or more than three processing entities. In some examples, the processing entities 102-1 to 102-3 include threads that execute in the system 100. In other examples, the processing entities 102-1 to 102-3 can include hardware processors or other types of processing entities.

The system 100 can include one compute node or multiple compute nodes.

Each processing entity processes a respective input data collection to perform a data analytics operation (e.g., a counting sort operation). The processing entity 102-1 processes an input data collection 104-1, the processing entity 102-2 processes an input data collection 104-2, and the processing entity 102-3 processes an input data collection 104-3. An "input data collection" includes a collection of data records (one data record or multiple data records), where each data record includes a collection of attributes (one attribute or multiple attributes). An attribute(s) of the collection of attributes of a data record forms a key. The input data collections 104-1 to 104-3 may be received from entities in the system 100 or from external sources.

Each processing entity 102-1, 102-2, or 102-3 uses a corresponding micro-accumulator 106-1, 106-2, or 106-3 to perform data accumulation (e.g., counting of data values or another type of data aggregation).

Each micro-accumulator is a processing entity-local data structure that is associated with (or more specifically, used by) a corresponding processing entity. For example, the micro-accumulator 106-1 is associated with the processing entity 102-1, the micro-accumulator 106-2 is associated with the processing entity 102-2, and the micro-accumulator 106-3 is associated with the processing entity 102-3.

A given micro-accumulator associated with a given processing entity is updated based on data records processed by the given processing entity, and is not updated based on data records processed by other processing entities not associated with the given micro-accumulator. In this manner, the given micro-accumulator is a private micro-accumulator of the given processing entity, and can be updated by the given processing entity without contention from other processing entities, which can reduce cache misses when updating random locations of the histogram 108.

Cache contention may result when different processing entities request exclusive access to data in the same cache line, for instance when high frequency key values are close in value, which can incur extra latency to gain access to the data.

The number of entries in each micro-accumulator is defined so the aggregate size of the processing entities' software caches would not exceed the size of the last level cache (e.g., an L3 cache in a computing node with three cache levels). Provisioning for all software caches to remain resident in the last level cache reduces the number of cache misses and associated extra latency and bandwidth consumption.

The input data collections 104-1 to 104-3 are provided to respective micro-accumulators 106-1, 106-2, and 106-3 for applying data accumulation (e.g., counting of unique values of keys of input data records or other types of aggregation of values of keys of input data records) associated with a data analytics operation being performed in the system 100. Each micro-accumulator is an example of the accumulation data structure implemented in a cache as mentioned above. Further details of each micro-accumulator are described in connection with FIG. 2.

As depicted in FIG. 1, the processing entities 102-1 to 102-3 can update respective portions of a histogram 108 with accumulated values in the micro-accumulators 106-1 to 106-3. The histogram 108 is stored in a shared memory 110.

As noted above, the histogram 108 can be divided into multiple bins, where each bin corresponds to a unique value of a key contained in input data. More specifically, each bin can contain a count value that represents a quantity of occurrences of the corresponding unique value of the key, in examples where a counting sort operation is performed using the micro-accumulators 106-1 to 106-3 based on data records processed by the processing entities 102-1 to 102-3.

If there are N (N≥1) unique value(s) of the key, then there would be N bin(s) in the histogram 108 that contain(s) a non-zero count value.

Each processing entity is assigned exclusive ownership over a respective histogram portion of the histogram 108, safely allowing a single-writer access to bins of the respective histogram portion. Each histogram portion includes a collection of bins (one bin or multiple bins).

A respective histogram portion of the histogram 108 can be written by the processing entity that owns the respective histogram portion, but not by other processing entities. Segmenting the histogram 108 among the processing entities can also help with cache locality. The efficiency gained by performing non-atomic writes to the histogram 108 more than makes up for message handling between the processing entities in order to indirectly modify the histogram in memory.

In the example of FIG. 1, the processing entity 102-1 owns a histogram portion 108-1, the processing entity 102-2 owns a histogram portion 108-2, and the processing entity 102-3 owns a histogram portion 108-3. In some examples, the histogram portions 108-1, 108-2, and 108-3 are interleaved portions. Interleaving the histogram portions 108-1, 108-2, and 108-3 refers to alternating segments of histogram portions 108-1, 108-2, and 108-3 such that multiple segments of any given histogram portion are separated by segments of other histogram portions.

As further represented by arrows 112, the processing entities 102-1 to 102-3 can communicate with one another. For example, a first processing entity can send a count value from a first micro-accumulator associated with the first processing entity to a second processing entity to cause the second processing entity to update a respective bin of the histogram 108 with the count value sent by the first processing entity. The count value from the first micro-accumulator that is sent by the first processing entity to the second processing entity may correspond to a bin that is in a histogram portion owned by the second processing entity. In this scenario, the first processing entity would be unable to update the bin in the histogram portion owned by the second processing entity, so that the first processing entity sends the count value to the second processing entity to perform the update.

Figure 2:
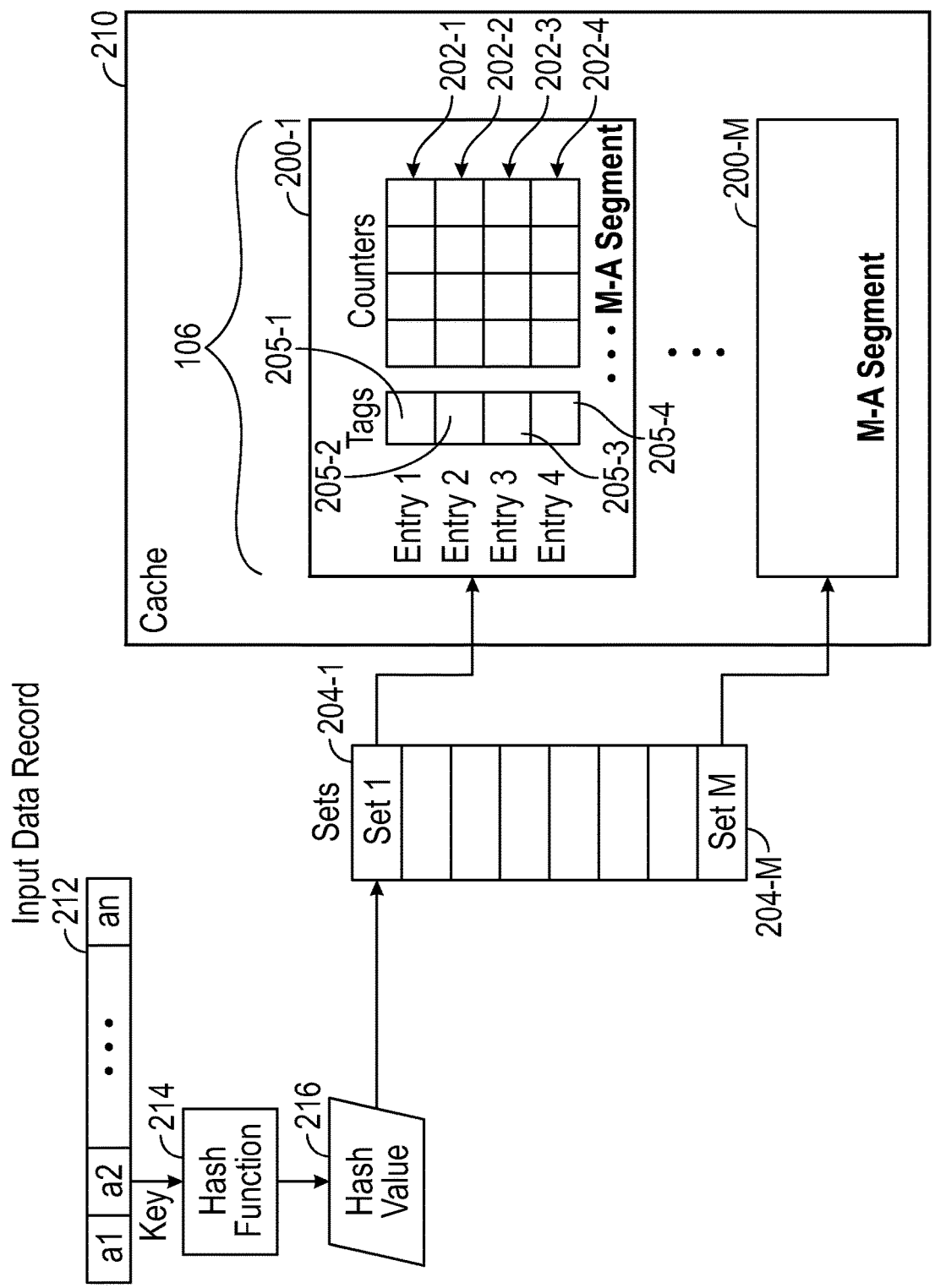
FIG. 2 is a block diagram of a micro-accumulator according to some examples.

FIG. 2 shows an example of a micro-accumulator 106, which can be any of the micro-accumulators 106-1 to 106-3 in FIG. 1. The micro-accumulator 106 includes M (M≥1) micro-accumulator segments 200-1 to 200-M (each represented as "M-A segment" in FIG. 2). The micro-accumulator segments 200-1 to 200-M are stored in a cache 210, such as a last level cache of a compute node. In examples with three levels of caches, the last level cache is the L3 cache.

The micro-accumulator segments 200-1 to 200-M are associated with respective different sets 204-1 to 204-M. Each micro-accumulator segment 200-$j$ ($j$=1 to M) maps to a respective set 204-$j$.

Each set 204-$j$ represents a respective micro-accumulator segment 200-$j$ that can fit within a unit of access that is used to store the micro-accumulator segments. In some examples, the unit of access is a cache line of the cache 210. A cache line is a unit of data transfer between the cache 210 and the shared memory 110. Thus, each micro-accumulator segment 200-$j$ fits in a respective cache line of the cache 210, in some examples.

The accumulation data structure that includes the micro-accumulator segments 200-1 to 200-M implements a multi-way, set-associative cache where the cache is divided into M sets, and each set includes P (P≥1) entries. Multiple keys map to a set and can be held concurrently in the cache 210. The mapping of a key to a set is done through a hash function 214 (discussed further below).

The micro-accumulator segment 200-1 includes multiple entries 1, 2, 3, 4, . . . , where each set including the multiple entries fits in a cache line of the cache 210. Each entry includes a collection of counters. In the example of FIG. 2, four entries are shown in the micro-accumulator segment 200-1. A collection of counters can include just a single counter or multiple counters. In examples discussed herein, it is assumed that each entry includes four counters.

In the example of FIG. 2, entry 1 includes a collection of counters 202-1, entry 2 includes a collection of counters 202-2, entry 3 includes a collection of counters 202-3, and entry 4 includes a collection of counters 202-4.

Each counter has a specified length (e.g., each counter is implemented using a number of bits). The counter can count up to a maximum value corresponding to the number of bits of the counter. The length of each counter is such that the maximum value of the counter is less than the possible value that can be contained in each bin of the histogram 108.

Each entry further contains a corresponding tag. Entry 1 includes a tag 205-1, entry 2 includes a tag 205-2, entry 3 includes a tag 205-3, entry 4 includes a tag 205-4, and so forth. Each tag 205-$i$ ($i$ equal 1 to P) includes an index to a corresponding bin of the histogram 108. In examples according to FIG. 2, each counter (which corresponds to a respective bin of the histogram 108) is to count a quantity of occurrences of a corresponding unique value of the key.

The four counters in the collection of counters 202-1 shown in FIG. 2 correspond to four different bins of the histogram 108. The tag 205-1 refers to the first bin of the four bins corresponding to the counters in entry 1.

Thus, if the counters of the collection of counters 202-1 correspond to bins 0, 1, 2, and 3, respectively, of the histogram 108, then the tag 205-1 contains an index to bin 0. Similarly, if the counters of the collection of counters 202-2 correspond to bins 12, 13, 14, and 15, respectively, of the histogram 108, then the tag 205-2 in entry 2 contains an index to bin 12.

The micro-accumulator segment 200-M has an arrangement that is similar to that of the micro-accumulator segment 200-1.

An input data record 212, to be processed by a processing entity, can be mapped to one of the sets 204-1 to 204-M. In the example of FIG. 2, the input data record 212 has multiple attributes $a1, a2, \ldots, an$. In the example, it is assumed that attribute $a2$ is the key, and the value of the key is provided to an input of the hash function 214. In some examples, the hash function 214 can be a cryptographic hash function, such as a Secure Hash Algorithm (SHA) function in some examples. The possible hash values produced by the hash function 214 correspond to the number of sets in the cache 210. In some examples, the key values are mapped uniformly over the total number of sets for higher cache utilization.

The hash function 214 produces a hash value 216 based on the value the key (value of the attribute $a2$). The hash value 216 maps to one of the sets 204-1 to 204-M. In the example of FIG. 2, it is assumed that the hash value 216 maps to the set 204-1. Different hash values produced by the hash function 214 would map to different sets.

Different unique values of the key (attribute $a2$) would map to different bins of the histogram 108. Accordingly, a value of the key in the input data record 212 would map to one of the entries of the micro-accumulator segment 200-1, and more specifically, to one of the counters that corresponds to the bin to which the value of the key maps to. The mapped counter would then increment to count another instance of the value of the key has occurred.

Figure 3:
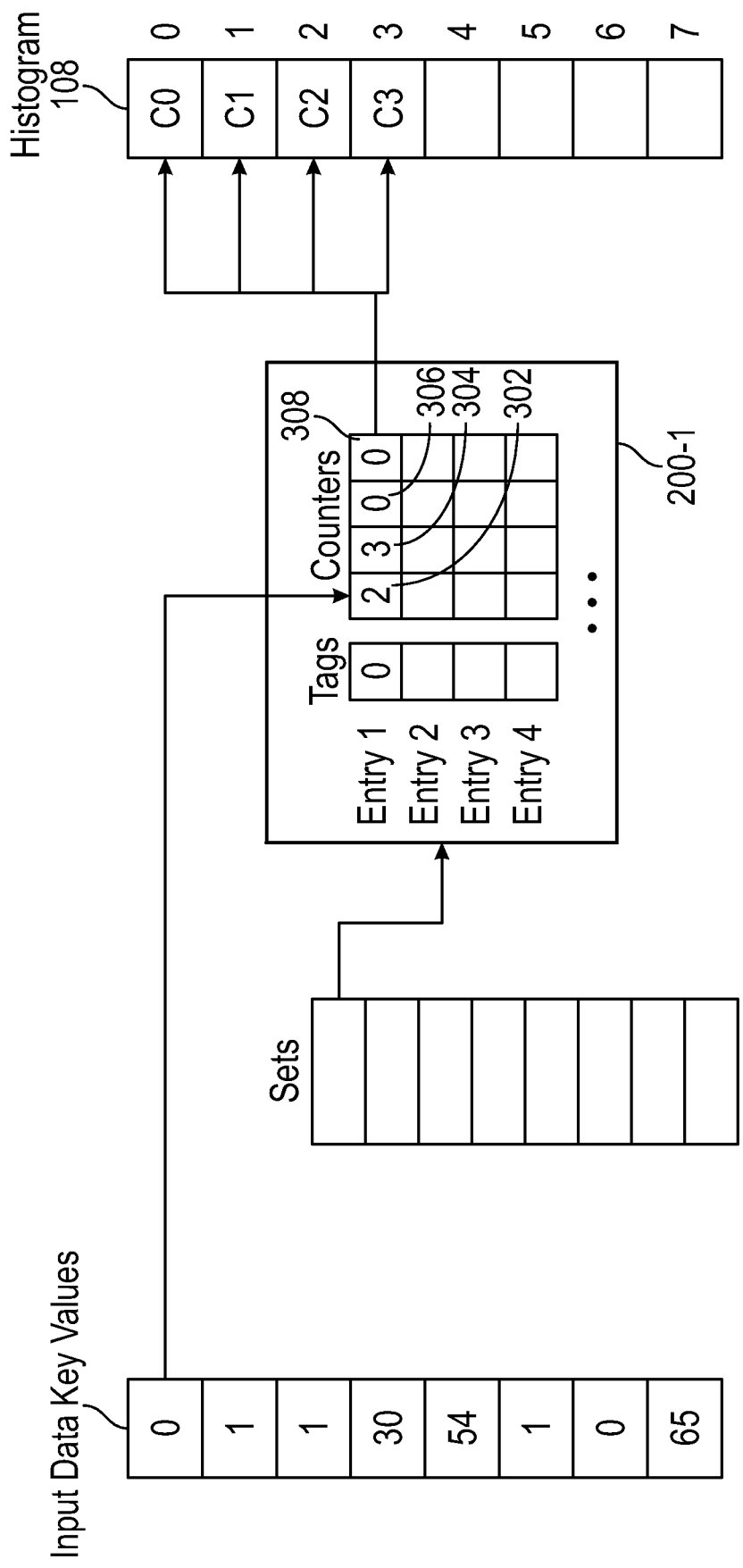
FIG. 3 is a block diagram of a micro-accumulator segment and a histogram, according to some examples.

FIG. 3 shows example key values of different input data records. In the example of FIG. 3, the key values of input data records include 0, 1, 1, 30, 54, 1, 0, and 65. The key value 0 maps to entry 1 and a counter 302 in entry 1 in the micro-accumulator segment 200-1. As further shown in FIG. 3, the four counters 302, 304, 306, and 308 in entry 1 of the micro-accumulator segment 200-1 map to respective bins 0, 1, 2, and 3, respectively, of the histogram 108. In the example, the tag for entry 1 contains a value 0 that is an index to bin 0 in the histogram 108.

Bins 0, 1, 2, and 3 of the histogram 108 contain count values C0, C1, C2, and C3, respectively. A count value in a bin of the histogram 108 is updated when a value of a counter in the micro-accumulator 106 is merged into the bin.

2. Spilling from a Micro-Accumulator to the Histogram

As noted above, each counter of a micro-accumulator has a restricted range, based on a number of bits of the counter. For example, if the counter is an 8-bit counter, then the counter can count from 0 to 255 (where 255 is the maximum value of the 8-bit counter). Note that this maximum value of 255 can be significantly less than the maximum value that can be stored in a corresponding bin of the histogram 108.

Because the micro-accumulator tracks values in a restricted range, the micro-accumulator differs from a typical cache in that the micro-accumulator does not reflect the global data, such as in the histogram 108.

When a counter reaches its maximum value, e.g., 255 for an 8-bit counter, a spilling operation is triggered to cause an entry of the corresponding micro-accumulator segment to be spilled to the histogram 108. For example, in FIG. 3, if the counter 304 in entry 1 of the micro-accumulator segment 200-1 reaches its maximum value, the triggered spilling operation will cause entry 1 (which includes values of four counters 302, 304, 306, and 308) to be spilled over to update respective bins (e.g., bins 0, 1, 2, and 3) in the histogram 108. Thus, the count value C0 in bin 0 of the histogram 108 is updated with the value of the counter 302, such as by adding the value of the counter 302 to the existing count value C0 in bin 0, and similarly, the count values in bins 1, 2, and 3 are updated with values of the respective counters 304, 306, and 308.

After the spilling operation is complete, counter values in entry 1 can be reset (e.g., such as to zero). Alternatively, the counter values in entry 1 can be invalidated.

Note also that when an entry of a micro-accumulator segment 200-j is initialized for a new tag, all counters for that entry are reset to zero.

In accordance with some examples of the present disclosure, a processing entity is able to update a value in a bin of the histogram 108 without performing multiple accesses of the bin. Multiple accesses of a bin of the histogram 108 associated with updating the bin would consume memory bandwidth that can slow down a counting sort operation (or another type of data analytics) in examples where there is a large quantity of data records (e.g., petabytes of data) to process.

Using techniques according to some examples of the present disclosure, data analytics performance can be optimized by parallelizing the data aggregation process (e.g., key value counting) and reducing memory accesses based on use of micro-accumulators to update bins of a histogram or another output data structure.

Techniques according to some examples of the present disclosure allow each processing entity (e.g., 102-1, 102-2 or 102-3 in FIG. 1) to operate independently by updating a private micro-accumulator data structure in parallel. Since each processing entity has its own micro-accumulator, no inter-thread synchronization has to be performed to update values. Also, the micro-accumulators can reduce cache line sharing, or the frequency that cache line ownership changes. The micro-accumulators can be designed to be small for cache efficiency, and can occasionally update the histogram with accumulated values for respective keys.

3. Eviction

When all the entries of a micro-accumulator segment 200-j are populated, then eviction may occur if further input data records for the corresponding set 204-j contain unique values of the keys that do not correspond to any of the counters in the micro-accumulator segment 200-j. To evict an entry of the micro-accumulator segment 200-j, the values of the counters in the entry to be evicted are spilled over to corresponding bins of the histogram 108. For example, if entry 1 of the micro-accumulator segment 200-1 is to be evicted, then the values of the counters 302, 304, 306, and 308 are spilled over to respective bins in 0, 1, 2, and 3 of the histogram 108.

The selection of the entry of the micro-accumulator segment 200-j to be evicted can be based on any eviction criterion. In some examples, the eviction criterion used can be a least frequently used criterion, where the entry selected from multiple entries of the micro-accumulator segment 200-j for eviction is the entry that is least frequently used. For example, an entry's frequency is determined by the total value of its counters.

In other examples, the eviction criterion is a least recently used criterion, where the entry selected from the multiple entries of the micro-accumulator segment 200-j for eviction is the entry that was least recently used. In further examples, other eviction criteria can be used to select an entry for eviction.

In some examples, the updating of bins of the histogram can be performed without using atomic operations, which is accomplished by associating different histogram portions (e.g., 108-1, 108-2, and 108-3 in FIG. 1) with respective different processing (e.g., 102-1, 102-2, and 102-3). A histogram portion is updated by just one of the processing entities so that atomic operations do not have to be employed (since there would be no contention between multiple processing entities for a given histogram portion).

4. Processing Entity Synchronization

As noted above, each processing entity can be assigned exclusive ownership over a respective histogram portion of the histogram 108, ensuring that just a single processing entity is able to access bins of the respective histogram portion. As a result, atomic updates of bins in the histogram 108 do not have to be used.

A bin of a histogram is updated in response to any of several events. A first event involves a spillover operation when a counter in a micro-accumulator segment has reached its maximum value. A second event involves eviction of an entry of a micro-accumulator segment to the histogram 108. A third event involves flushing of entries of micro-accumulator segments to the histogram 108 when a data analytics operation has completed (i.e., all input data records have been processed by the processing entities).

In further examples, there can be additional events that can cause count values in the micro-accumulators to update corresponding bins of the histogram 108.

Figure 4:
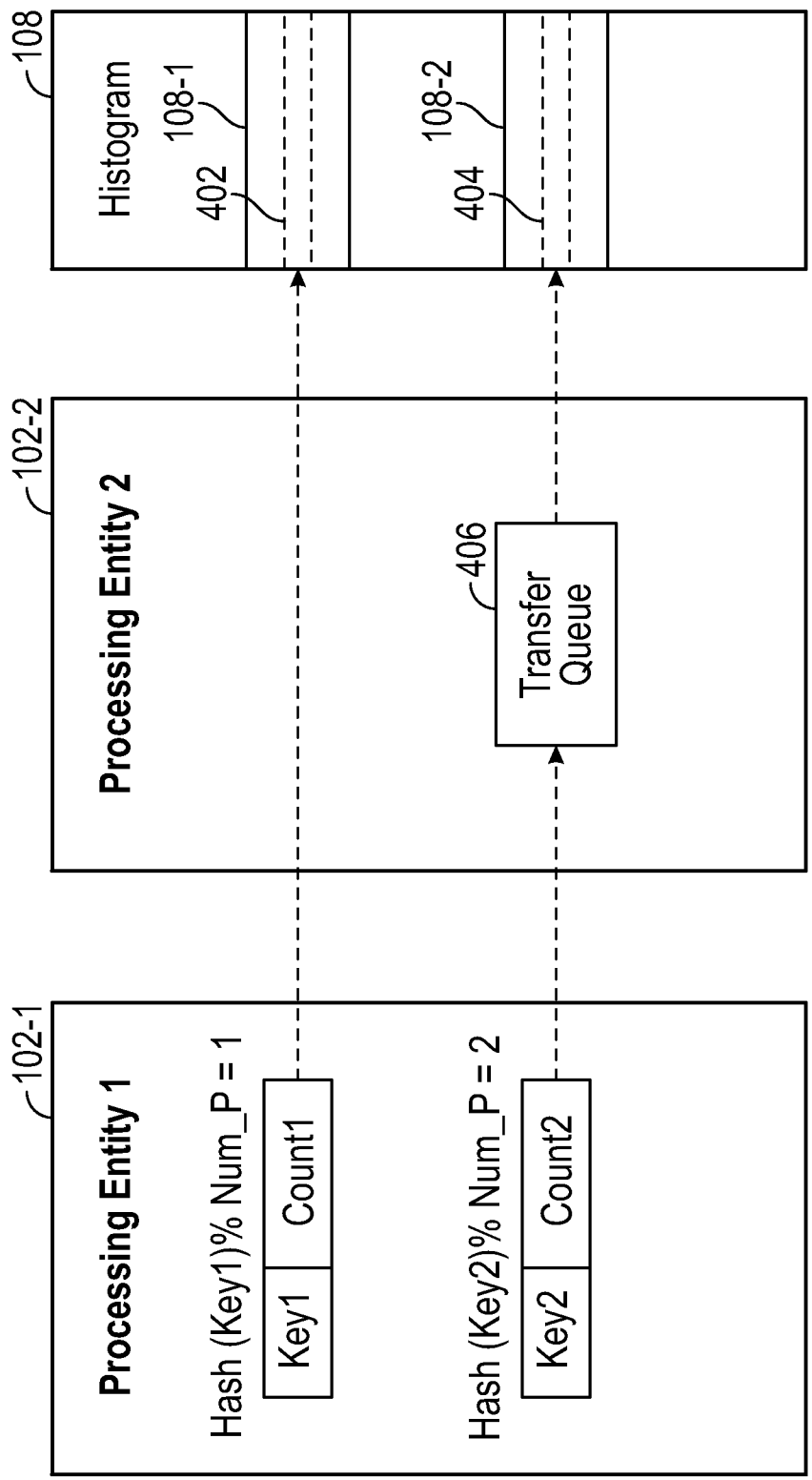
FIG. 4 is a block diagram of processing entities and a histogram, according to some examples.

To update histogram bins with respective count values of a micro-accumulator, a determination is first made of which processing entity owns the histogram portion(s) containing the bins to be updated. For example, as shown in FIG. 4, the processing entity 102-1 has count values Count1 and Count2 from a micro-accumulator associated with the processing entity 102-1 that are to be added to the histogram 108.

The processing entity 102-1 determines which processing entity owns a histogram portion containing the bin corresponding to Count1, and which processing entity owns a histogram portion containing the bin corresponding to Count2.

In some examples, this determination is based on a modulus operation applied on a hash value produced from a corresponding key value. In the example of FIG. 4, Count1 is associated with a key value Key1, and Count2 is associated with a key value Key2.

The processing entity 102-1 computes Hash(Key1)% Num_P, and computes Hash(Key2)% Num_P. Hash( ) represents the hash function 214 (FIG. 2) that is applied on a key value. The operator % represents a modulus operation. Num_P represents the number of processing entities in the system 100.

In a specific example, Hash(Key1)% Num_P produces an output number 1, which indicates that the processing entity 102-1 owns the histogram portion 108-1 that contains a bin 402 into which Count1 is to be added. In this case, the processing entity 102-1 adds (writes) Count1 to the bin 402 in the histogram portion 108-1 owned by the processing entity 102-1. Adding Count1 to the bin 402 causes Count1 to be summed with the count value currently in the bin 402, and the resultant sum is written in the bin 402.

In a specific example, Hash(Key2)% Num_P produces an output number 2, which indicates that the processing entity 102-2 owns the histogram portion 108-2 that contains a bin 404 into which Count2 is to be written. In this case, the processing entity 102-1 transfers Count2 to the processing entity 102-2, which then adds Count2 to the bin 402 to the histogram portion 108-2 owned by the processing entity 102-2.

In some examples, one processing entity can send a message to another processing entity using a transfer queue, such as a transfer queue 406 of the processing entity 102-2. Each processing entity includes a respective transfer queue. Although referred to in the singular sense, note that a "transfer queue" can include a single queue or multiple queues. In examples where a transfer queue includes multiple queues, the multiple queues can be arranged in multiple tiers of queues to minimize (or reduce) atomic operations involved in transferring count values between processing entities for updating the histogram 108.

In the example of FIG. 4, the processing entity 102-1 passes Count2 in a message to the transfer queue 406 of the processing entity 102-2. The processing entity 102-2 can retrieve Count2 from the transfer queue 406 to write Count2 to the bin 404 in the histogram 108. Note that the transfer queue 406 can include multiple entries containing respective count values that are to be written to the histogram 108. The count values can be transferred to the transfer queue 406 by other processing entities.

In examples where the transfer queue 406 includes multiple tiers of queues, a first tier can include a work queue into which a source processing entity (e.g., the processing entity 102-1) writes a message to a destination processing entity (e.g., the processing entity 102-2). The transfer queue 406 can include multiple work queues in the first tier, where the multiple work queues are associated with respective different processing entities. For example, the first processing entity 102-1 can send messages to a first work queue in the transfer queue 406 of the second processing entity 102-2, and another processing entity (e.g., 102-3) can send messages to another work queue in the transfer queue 406 of the second processing entity 102-2.

In some examples, multiple messages can build up in a work queue until a threshold quantity of messages are queued. In response to the threshold quantity of messages being queued, the source processing entity can send a notification to a notification queue in a second tier. The notification queue can be shared by multiple processing entities.

The notification identifies which processing entity's work queue has pending messages. In response to receiving the notification, the destination processing entity retrieves respective entries from the work queue of the source processing entity, and adds each non-zero counter value to the histogram 108. As the destination processing entity owns the histogram portion to which the count values of the work queue are to be added, the destination processing entity is able to perform updates without any atomic operations.

Note also that no atomic operations are employed to write messages to a work queue, since each source processing entity writes messages to a respective different work queue in the destination processing entity.

However, since the notification queue is shared by multiple processing entities, a notification is written to the notification queue using an atomic operation.

5. Example System Including Accumulators

Figure 5:
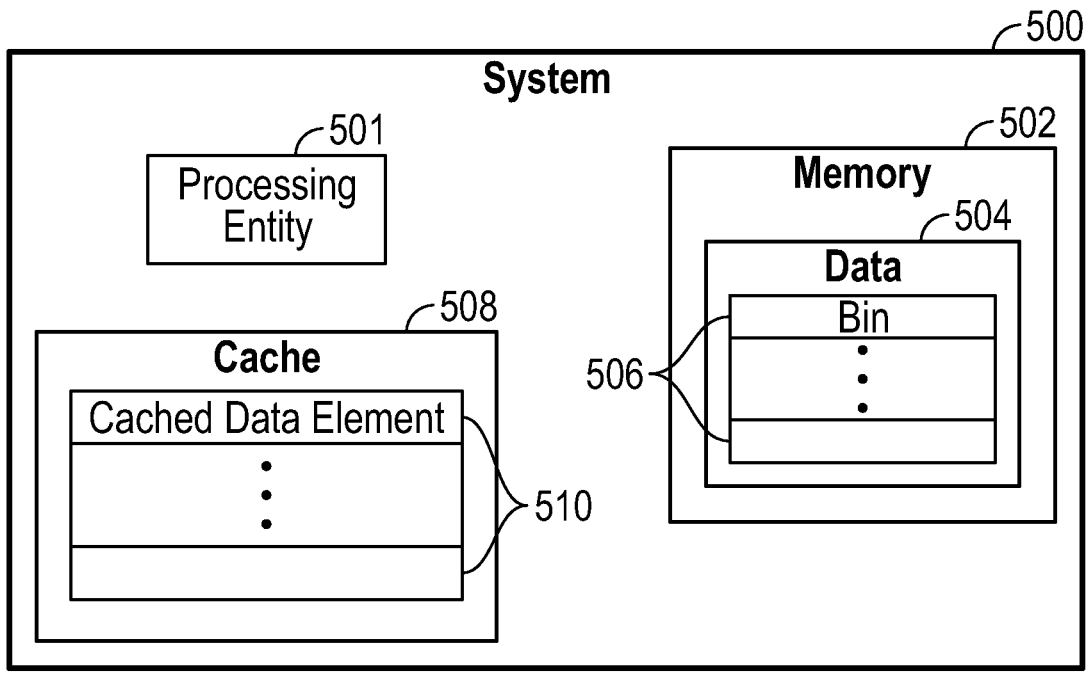
FIG. 5 is a block diagram of a system according to some examples.

FIG. 5 shows an example system 500 that includes a processing entity 501 and a memory 502 to store data 504 arranged in a plurality of bins 506 associated with respective key values of a key. An example of the data 504 is a histogram (e.g., 108). In other examples, the data 504 can be a different type of data.

The system 500 includes a cache 508 to store cached data elements 510 (e.g., count values) for respective accumulators (e.g., counters) that are updatable to represent occurrences of respective key values of the key. The accumulators can be part of the micro-accumulators discussed further above, for example. Each accumulator corresponds to a different bin 506 in the data 504, and each cached data element 510 has a range that is less than a range of a corresponding bin 506.

Responsive to a value of a given cached data element 510 as updated by a given accumulator satisfying a criterion (e.g., reaching a maximum value of the cached data element 510 or satisfying another criterion), the processing entity 501 is to cause an aggregation of the value of the given cached data element with a bin value in a respective bin 506 of the data 504.

In some examples, the given accumulator is to incrementally update the given cached data element 510 as data records are received that contain a given key value corresponding to the given accumulator.

In some examples, until the criterion is satisfied, the given accumulator is to incrementally update the given cached data element 510 in the cache 508 as the data records are received without accessing the respective bin 506 in the memory 502.

In some examples, the accumulators are counters, and the cached data elements 510 are cached count values.

In some examples, the processing entity 501 maps collections of the key values to respective sets (e.g., sets 204-1 to 204-M in FIG. 2), where each set includes a plurality of accumulators.

In some examples, the plurality of accumulators of each set fit within a respective cache line of the cache 508.

In some examples, the mapping of the collections of the key values to the respective sets is based on applying a hash function to the key values.

In some examples, the cache 508 further stores tags (e.g., 205-1 to 205-4 in FIG. 2) associated with corresponding accumulators, where each tag includes an index referencing a bin 506.

In some examples, the processing entity 501 is a first processing entity, and the accumulators and the cached data elements are part of a first accumulator structure. The system 500 includes a plurality of processing entities, where the first accumulator structure is associated with the first processing entity 501, and where the plurality of processing entities include a second processing entity associated with a second accumulator structure containing cached data elements associated with accumulators and stored in the cache 508.

In some examples, the plurality of processing entities are to apply data analytics on input data records in parallel with one another, and the plurality of processing entities are to use respective accumulator structures that are private to respective processing entities of the plurality of processing entities so that the plurality of processing entities do not contend for access of any of the accumulator structures.

In some examples, the plurality of bins 506 of the data 504 in the memory 502 are partitioned into a plurality of partitions of bins (e.g., histogram portions 108-1, 108-2, and 108-3 in FIG. 1), where the first processing entity owns a first partition of the plurality of partitions of bins, and the second processing entity owns a second partition of the plurality of partitions of bins.

In some examples, if the respective bin is in the second partition, the first processing entity is to send the value of the given cached data element 510 to the second processing entity to cause the second processing entity to aggregate the value of the given cached data element 510 with the bin value in the respective bin 506.

In some examples, the aggregation of the value of the given cached data element with the bin value in the respective bin is performed without using any atomic operation to write to the memory.

Figure 6:
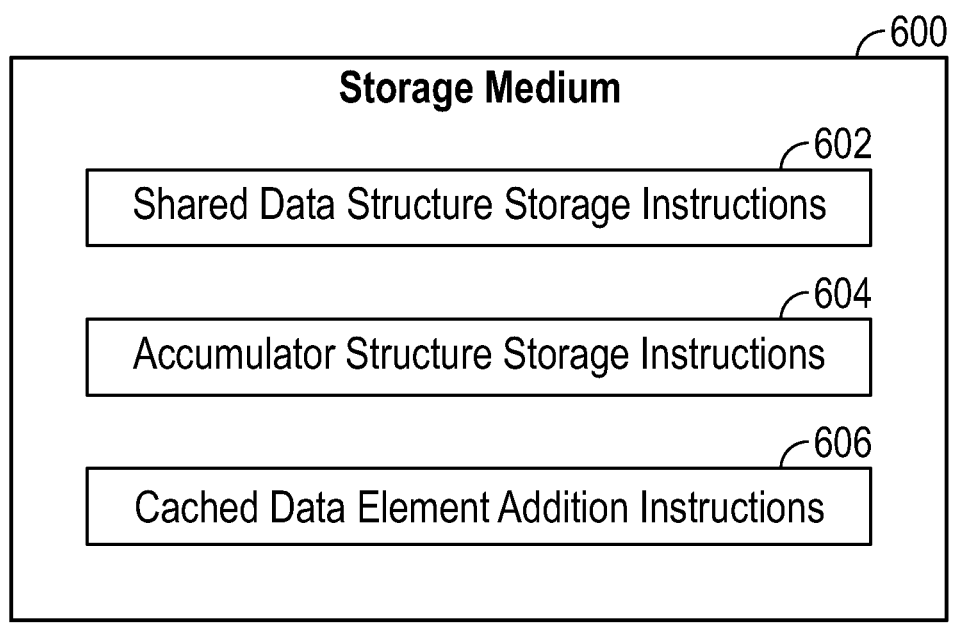
FIG. 6 is a block diagram of the storage medium storing machine-readable instructions according to some examples.

FIG. 6 shows a non-transitory machine-readable or computer-readable storage medium 600 storing machine-readable instructions that upon execution cause a system to perform various tasks.

The machine-readable instructions include shared data structure storage instructions 602 to store a shared data structure in a memory, the shared data structure being shared by a plurality of processing entities and being arranged in a plurality of bins associated with respective key values of a key.

The machine-readable instructions include accumulator structures storage instructions 604 to store, in a cache, accumulator structures for respective processing entities of the plurality of processing entities. Each accumulator structure includes cached data elements for respective accumulators, the cached data elements being updatable to represent occurrences of respective key values of the key, where each accumulator corresponds to a different bin in the shared data structure.

In some examples, each cached data element of the cached data elements has a range that is less than a range of a corresponding bin of the plurality of bins.

In some examples, the shared data structure is a histogram, and the accumulators are counters.

The machine-readable instructions include cached data element addition instructions 606 to, responsive to a value of a given cached data element as updated by a given accumulator in a first accumulator structure of the accumulator structures satisfying a criterion, initiate, by a first processing entity, an addition of the value of the given cached data element to a respective bin in the memory without using any atomic write operation.

Figure 7:
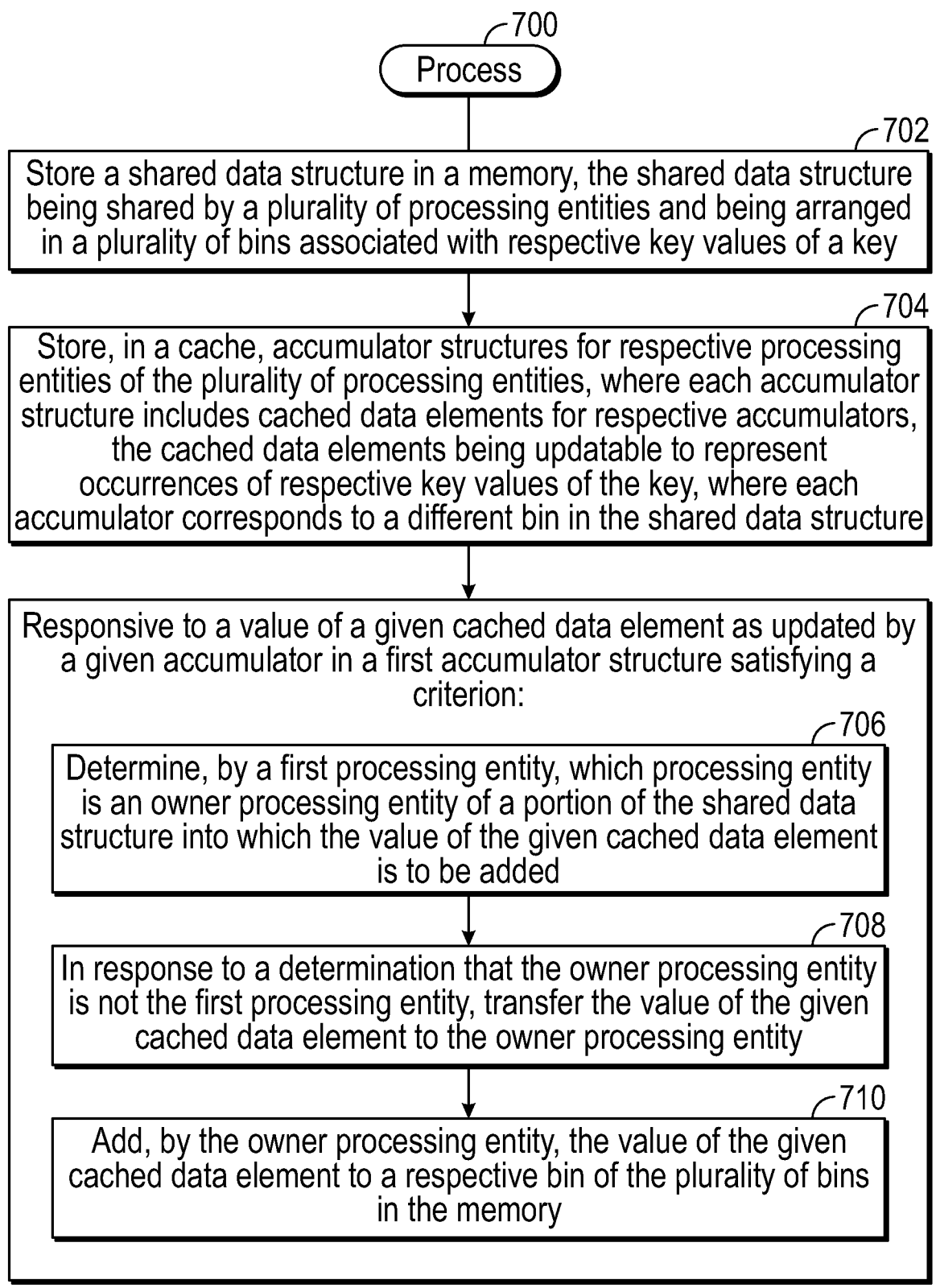
FIG. 7 is a flow diagram of a process according to some examples.

FIG. 7 is a flow diagram of a process 700, which can be performed by a system including a hardware processor (e.g., the system 100 of FIG. 1). A hardware processor can include a microprocessor, a core of a multi-core microprocessor, a microcontroller, a programmable integrated circuit, a programmable gate array, or another hardware processing circuit.

The process 700 includes storing (at 702) a shared data structure in a memory, the shared data structure being shared by a plurality of processing entities and being arranged in a plurality of bins associated with respective key values of a key.

The process 700 includes storing (at 704), in a cache, accumulator structures for respective processing entities of the plurality of processing entities, where each accumulator structure includes cached data elements for respective accumulators, the cached data elements being updatable to represent occurrences of respective key values of the key, where each accumulator corresponds to a different bin in the shared data structure.

Responsive to a value of a given cached data element as updated by a given accumulator in a first accumulator structure satisfying a criterion, the process 700 performs tasks 706, 708, and 710.

The task 706 determines, by a first processing entity, which processing entity is an owner processing entity of a portion of the shared data structure into which the value of the given cached data element is to be added.

In response to a determination that the owner processing entity is not the first processing entity, the task 708 transfers the value of the given cached data element to the owner processing entity.

The task 701 adds, by the owner processing entity, the value of the given cached data element to a respective bin of the plurality of bins in the memory.

A storage medium (e.g., 600 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   one or more hardware processors;
   a plurality of processing entities comprising a first processing entity and a second processing entity executable on the one or more hardware processors;
   a memory to store data arranged in a plurality of bins associated with respective key values of a key, wherein the plurality of bins of the data in the memory are partitioned into a plurality of partitions of bins, the first processing entity owns a first partition of the plurality of partitions of bins, and the second processing entity owns a second partition of the plurality of partitions of bins; and
a cache to store first cached data elements for respective first accumulators, and second cached data elements for respective second accumulators, wherein the first cached data elements are part of a first accumulator structure associated with the first processing entity, and the second cached data elements are part of a second accumulator structure associated with the second processing entity,
wherein the first and second cached data elements are updatable to represent occurrences of the respective key values of the key, wherein each accumulator of the first and second accumulators corresponds to a different bin of the plurality of bins, and each cached data element of the first and second cached data elements has a range that is less than a range of a corresponding bin of the plurality of bins, and
wherein responsive to a value of a given cached data element as updated by a given accumulator of the first and second accumulators satisfying a criterion, a respective processing entity of the plurality of processing entities is to cause an aggregation of the value of the given cached data element with a bin value in a respective bin of the plurality of bins.

2. The system of claim 1, wherein the given accumulator is to incrementally update the given cached data element as data records are received that contain a given key value corresponding to the given accumulator.

3. The system of claim 2, wherein until the criterion is satisfied, the given accumulator is to incrementally update the given cached data element in the cache as the data records are received without accessing the respective bin in the memory.

4. The system of claim 1, wherein the first and second accumulators are counters, and the first and second cached data elements are cached count values.

5. The system of claim 1, wherein the respective processing entity is to:
map collections of key values of the key to respective sets, each set of the sets comprising a plurality of accumulators.

6. The system of claim 5, wherein the plurality of accumulators of each set fit within a respective cache line of the cache.

7. The system of claim 5, wherein the mapping of the collections of key values to the respective sets is based on applying a hash function to the key values in the collections of key values.

8. The system of claim 1, wherein the cache is to further store tags associated with corresponding accumulators, each tag of the tags comprising an index referencing a bin of the plurality of bins.

9. The system of claim 1, wherein the plurality of processing entities are to independently update respective accumulator structures in parallel.

10. The system of claim 1, wherein the respective processing entity is to evict a collection of cached data elements in the cache to the data in the memory, according to an eviction criterion.

11. The system of claim 1, wherein the aggregation of the value of the given cached data element with the bin value in the respective bin is performed without using any atomic operation to write to the memory.

12. A system comprising:
one or more hardware processors;
a plurality of processing entities comprising a first processing entity and a second processing entity executable on the one or more hardware processors;
a memory to store data arranged in a plurality of bins associated with respective key values of a key; and
a cache to store first cached data elements for respective first accumulators, and second cached data elements for respective second accumulators, wherein the first cached data elements are part of a first accumulator structure associated with the first processing entity, and the second cached data elements are part of a second accumulator structure associated with the second processing entity, wherein the first and second cached data elements are updatable to represent occurrences of the respective key values of the key, wherein each accumulator of the first and second accumulators corresponds to a different bin of the plurality of bins, and each cached data element of the first and second cached data elements has a range that is less than a range of a corresponding bin of the plurality of bins,
wherein the plurality of processing entities are to apply data analytics on input data records in parallel with one another, and the plurality of processing entities are to use respective accumulator structures that are private to respective processing entities of the plurality of processing entities so that the plurality of processing entities do not contend for access of any of the accumulator structures, wherein the accumulator structures include the first accumulator structure and the second accumulator structure, and
wherein responsive to a value of a given cached data element as updated by a given accumulator of the first and second accumulators satisfying a criterion, a respective processing entity of the plurality of processing entities is to cause an aggregation of the value of the given cached data element with a bin value in a respective bin of the plurality of bins.

13. The system of claim 12, wherein the plurality of bins of the data in the memory are partitioned into a plurality of partitions of bins, wherein the first processing entity owns a first partition of the plurality of partitions of bins, and the second processing entity owns a second partition of the plurality of partitions of bins.

14. The system of claim 13, wherein if the respective bin is in the second partition, the respective processing entity is to send the value of the given cached data element to the second processing entity to cause the second processing entity to aggregate the value of the given cached data element with the bin value in the respective bin.

15. A non-transitory machine-readable storage medium comprising instructions that upon execution cause a system to:
store a shared data structure in a memory, the shared data structure being shared by a plurality of processing entities and being arranged in a plurality of bins associated with respective key values of a key;
store, in a cache, accumulator structures for respective processing entities of the plurality of processing entities, wherein each accumulator structure of the accumulator structures includes cached data elements for respective accumulators, the cached data elements being updatable to represent occurrences of respective key values of the key, wherein each accumulator of the accumulators corresponds to a different bin of the plurality of bins in the shared data structure; and responsive to a value of a given cached data element as updated by a given accumulator in a first accumulator structure of the accumulator structures satisfying a criterion, initiate, by a first processing entity of the plurality of processing entities, an addition of the value of the given cached data element to a respective bin of the plurality of bins in the memory without using any atomic write operation.

16. The non-transitory machine-readable storage medium of claim 15, wherein each cached data element of the cached data elements has a range that is less than a range of a corresponding bin of the plurality of bins.

17. The non-transitory machine-readable storage medium of claim 15, wherein the shared data structure is a histogram, and the accumulators are counters.

18. The non-transitory machine-readable storage medium of claim 15, wherein until the criterion is satisfied, the given accumulator is to incrementally update the given cached data element in the cache as data records are received without accessing the respective bin in the memory.

19. A method of a system comprising a hardware processor, comprising:
  storing a shared data structure in a memory, the shared data structure being shared by a plurality of processing entities and being arranged in a plurality of bins associated with respective key values of a key;
  store, in a cache, accumulator structures for respective processing entities of the plurality of processing entities, wherein each accumulator structure of the accumulator structures includes cached data elements for respective accumulators, the cached data elements being updatable to represent occurrences of respective key values of the key, wherein each accumulator of the accumulators corresponds to a different bin of the plurality of bins in the shared data structure; and
  responsive to a value of a given cached data element as updated by a given accumulator in a first accumulator structure of the accumulator structures satisfying a criterion:
    determine, by a first processing entity of the plurality of processing entities, which processing entity is an owner processing entity of a portion of the shared data structure into which the value of the given cached data element is to be added,
    in response to a determination that the owner processing entity is not the first processing entity, transfer the value of the given cached data element to the owner processing entity, and
    add, by the owner processing entity, the value of the given cached data element to a respective bin of the plurality of bins in the memory.

20. The method of claim 19, wherein the transferring of the value of the given cached data element to the owner processing entity comprises the first processing entity adding a message containing the value of the given cached data element to a transfer queue in the owner processing entity.

* * * * *